US010492508B2

(12) United States Patent
Liu et al.

(10) Patent No.: US 10,492,508 B2
(45) Date of Patent: Dec. 3, 2019

(54) METHOD FOR EXTRACTING OIL FROM DEHYDRATED *EUPHAUSIA SUPERBA*

(71) Applicants: Yuanfa Liu, Wuxi (CN); Dewei Sun, Wuxi (CN); Jinwei Li, Wuxi (CN); Peirang Cao, Wuxi (CN)

(72) Inventors: Yuanfa Liu, Wuxi (CN); Dewei Sun, Wuxi (CN); Jinwei Li, Wuxi (CN); Peirang Cao, Wuxi (CN)

(73) Assignee: Jiangnan University, Wuxi, JS (CN)

( * ) Notice: Subject to any disclaimer, the term of this patent is extended or adjusted under 35 U.S.C. 154(b) by 318 days.

(21) Appl. No.: 15/597,037

(22) Filed: May 16, 2017

(65) Prior Publication Data
US 2017/0251688 A1 Sep. 7, 2017

Related U.S. Application Data

(63) Continuation of application No. PCT/CN2015/076056, filed on Apr. 8, 2015.

(51) Int. Cl.
*A23D 9/02* (2006.01)
*A23L 17/40* (2016.01)
(Continued)

(52) U.S. Cl.
CPC ............... *A23D 9/02* (2013.01); *A23L 17/40* (2016.08); *C11B 1/02* (2013.01); *C11B 1/10* (2013.01); *C11B 1/106* (2013.01); *A23V 2002/00* (2013.01)

(58) Field of Classification Search
CPC .. A23D 9/02; A23L 17/40; C11B 1/02; C11B 1/10; C11B 1/106; A23V 2002/00
See application file for complete search history.

(56) References Cited

U.S. PATENT DOCUMENTS 5,672,370 A * 9/1997 Durance ................. A23B 4/03
426/241
2011/0189760 A1* 8/2011 Yoshikawa ............... C11B 1/06
435/271

FOREIGN PATENT DOCUMENTS

CN 102405988 * 4/2012
CN 102485899 * 6/2012
(Continued)

OTHER PUBLICATIONS

English Translation for CN102492545 published Oct. 2013.*
(Continued)

*Primary Examiner* — Anthony J Weier
(74) *Attorney, Agent, or Firm* — Lili Chen

(57) ABSTRACT

The present invention provides a method for oil extraction from dehydrated *Euphausia superbas*, which is related to the field of food biotechnology. The method combines a low temperature and low oxygen heat pump dehydration system with a microwave-assisted frozen-blasting dehydration system for *Euphausia superba* dehydration, resulting in formation of a large number of micro porous structures in dehydrated *Euphausia superbas* that is good for subsequent oil extraction. The dehydration and extraction process can be separated in the present invention. The low temperature and low oxygen heat pump dehydration system may be installed in shrimp boats to dehydrate *Euphausia superbas* before transportation so as to increase the effective payloads of shrimp boats. The extraction process of subcritical fluid assisted with ultrasonic operation is carried out under low temperature and low oxygen conditions, therefore the oxidation of active ingredients is avoided to a large extent. Compared with existing methods, the present invention not only possess excellent dehydration efficiency but also uses less time and energy.

7 Claims, 3 Drawing Sheets

(51) Int. Cl.
  *C11B 1/02*    (2006.01)
  *C11B 1/10*    (2006.01)

(56)     References Cited

FOREIGN PATENT DOCUMENTS

| | | | |
|---|---|---|---|
| CN | 102533432 | * | 7/2012 |
| CN | 102492545 |   | 10/2013 |
| CN | 104479850 | * | 12/2014 |
| JP | 51022842 | * | 2/1976 |
| JP | 54076858 | * | 6/1979 |
| JP | S59196032 | * | 11/1984 |
| JP | H02100654 | * | 4/1990 |

OTHER PUBLICATIONS

English Translation for CN102533432 published Jul. 2012.*
Engl;ish Translation for CN104479850 published Dec. 2014.*
English Translation for JP51022842 published Feb. 1976.*
English Translation for JPS59196032 published Nov. 1984.*
English Translation for CN102405988 published Apr. 2012.*
English Translation for JP54076858 published Jun. 1979.*
English Translation for JPH02100654 published Apr. 1990.*
English Translation for CN102485899 published Jun. 2012.*

* cited by examiner

METHOD FOR EXTRACTING OIL FROM DEHYDRATED *EUPHAUSIA SUPERBA*

CROSS-REFERENCES AND RELATED APPLICATIONS

This application is a continuation of the international application PCT/CN2015/076056, with an international filing date of Apr. 8, 2015, which is herein incorporated by reference in its entirety.

BACKGROUND OF THE INVENTION

Field of the Invention

The present invention relates to the field of food biotechnology, and more particularly relates to a method for extracting oil from dehydrated *Euphausia superba*.

Description of the Related Art

*Euphausia superba* (Antarctic krill) is a pelagic shrimp-like invertebrate that lives in the Antarctic waters. *Euphausia superbas* live in large schools and feed on minute phytoplankton. It is the largest single biological resource in the world. The water content of fresh *Euphausia superba* is up to 80%. Currently, most of *Euphausia superba* are frozen for storage, transport and further process. In this way, the cost of transportation is very huge and the effective transportation payload is relatively low.

*Euphausia superba* is dehydrated before transportation and oil extraction. The process of dehydration is either under high temperature or high energy-consumption. The traditional solvent extraction of krill oil is accompanied by problems such as high temperature and incomplete desolvation. Supercritical $CO_2$ extraction is an effective method for oil extraction, however, the equipment for supercritical $CO_2$ extraction is pretty expensive and complex to use. Since supercritical $CO_2$ extraction is carried out under a high pressure, there are certain security risks. Other methods for preparing krill oil from *Euphausia superba* powder, fresh *Euphausia superba* or frozen *Euphausia superba* have the following disadvantages: (1) The drying process is high energy-consuming, low efficiency and environment-unfriendly. (2) The process of dehydration or oil extraction is carried out at high temperatures, which results in the oxidation of active ingredients.

To solve the existing problems, the present invention provides a method for dehydrating and extracting oil from Antarctic krill under relatively low temperature in a closed anaerobic environment, thus minimizing the oxidation of active ingredients and eliminating environmental problems caused by solvent volatilization. The oil extraction is performed under an ultrasound-assisted subcritical fluid extraction condition. It uses a short-term ultrasonic approach to generate a "vacuolar effect" in the extraction system so as to increase the contact of the substrate and the solvent. Since subcritical fluid is in gas phase under ambient conditions, high temperature is not needed for desolvation, and the solvent residue problem is minimized.

DETAILED DESCRIPTION

The first goal of the present invention is to provide a method for *Euphausia superba* dehydration. This method combines a low temperature and low oxygen heat pump dehydration system with a microwave-assisted frozen-blasting dehydration system so that the dehydrated *Euphausia superbas* form a micro porous structure that is good for subsequent oil extraction. The conventional dehydration method uses high temperatures (e.g. 80-100° C.) to remove water from *Euphausia superbas* which can lead to the oxidation of active ingredients. To solve this problem, the present invention performs the dehydration process under a lower temperature (e.g. 50-60° C.) in a closed anaerobic system with a heat pump, which can greatly reduce the oxidation of active ingredients during the dehydration. The dehydrated *Euphausia superbas* are further dehydrated with a microwave-assisted frozen-blasting dehydration system in which the dehydrated frozen *Euphausia superbas* are heated in microwave under a low pressure (e.g. <20 Pa) and a low temperature (e.g. −45° C. to −50° C.) to directly convert ice to water vapor. This process produces dehydrated krill with micro porous structures good for oil extraction. Compared with lyophilization method, the present invention not only possesses excellent dehydration efficiency but also uses less time and energy.

In one embodiment of the present invention, the *Euphausia superbas* are fresh or frozen.

In one embodiment of the present invention, the low temperature and low oxygen heat pump dehydration system is a drying system that efficiently utilizes thermal energy to achieve krill dehydration under low temperature and low oxygen conditions. After treated with the low temperature and low oxygen heat pump dehydration system, the water content of krill is decreased from 80±1% to 30%-35%. The low temperature and low oxygen heat pump dehydration system can be installed in shrimp boats to help increase the effective payload of shrimp boats.

In one embodiment of the present invention, the temperature of the low temperature and low oxygen heat pump dehydration system is maintained at 50-60° C. and filled with nitrogen to exclude air.

In one embodiment of the present invention, the pressure of the microwave-assisted frozen-blasting dehydration system is adjusted to lower than 20 Pa and its temperature to −45 to −50° C.; and the power of the microwave is 0.2±0.05 w/g. After treating with the microwave-assisted frozen-blasting dehydration, the water content of krill is further decreased to 8-9%.

The second goal of the present invention is to provide a method for extracting oil from dehydrated *Euphausia superbas*. Firstly, *Euphausia superba* is dehydrated by a low temperature and low oxygen heat pump dehydration system and a microwave-assisted frozen-blasting dehydration system; secondly, dehydrated krill is crushed into krill powder; thirdly, the krill powder is used for oil extraction by an ultrasound-assisted subcritical fluid extraction method.

In one embodiment of the present invention, the dehydrated krill are crushed to 30-60 mesh.

In one embodiment of the present invention, an ultrasound-assisted subcritical fluid extraction method is used to extract oil from dehydrated krill powder. The crushed krill is extracted in a subcritical extraction fluid under a high pressure with a simultaneous ultrasonic treatment. The extraction agent used for oil extraction is one or more reagents selected from butane, methyl ether, and 1,1,1,2-tetrafluoroethane, which are in a subcritical fluid state under a critical temperature and a critical pressure; the material-to-liquid ratio is 1:3-1:5 (g/ml); the extraction temperature is 40-50° C.; the extraction pressure is 1.1-1.3 MPa; the ultrasonic frequency used during extraction is 25-35 KHz. Single extraction process lasts 15-30 min and the extraction process is repeated 3-5 times. The subcritical extraction solvent become gas and is removed under a normal or reduced pressure, and the remaining extracts are then collected and centrifuged to remove the impurities.

The *Euphausia superba* oil prepared by the present invention is rich in unsaturated fatty acids and the DHA\EPA content of total fatty acids is more than 30%. The phospholipid content of *Euphausia superba* oil prepared by the present invention is more than 40%.

The present invention uses a low temperature and low oxygen heat pump dehydration system and a microwave-assisted frozen-blasting dehydration system for *Euphausia superba* dehydration. The Low temperature and low oxygen heat pump dehydration system has the advantage of saving time and energy when treating high moisture materials. At the same time, lipase and amylase can also be inactivated during this process, which is beneficial for subsequent krill oil extraction and protein utilization of the extracts. The advantage of the present invention is low-temperature operation, saving energy and high effeciency extraction.

In addition, dehydration and extraction process can be separated and carried out independently. The first stage of dehydration can be carried out in the boat if a low temperature and low oxygen heat pump dehydration system is installed in the shrimp boat. During the first stage, thermal energy is used efficiently to reduce the water content of the krill to 30-35%. Thus, the total weight of the krill material is reduced by about 70%. By this way, the present method is not only improved cargo capacity but also reduces transportation costs. The dehydrated *Euphausia superbas* can be frozen and stored in the boat after initial dehydration, and treated by a microwave-assisted frozen-blasting dehydration system until the ship is landed. In present invention, the pre-cooling procedure are omitted. The process of microwave-assisted frozen-blasting dehydration not only reduces water content but also generates a product with massive micro porous structures which is good for subsequent oil extraction.

The oil extraction process using ultrasound-assisted subcritical fluid is carried out at a low temperature and low oxygen environment, therefore oxidation of active ingredients is greatly minimized Subcritical fluid is in gaseous state under ambient conditions, therefore less energy is needed for the process of desolvation and the problem of residual solvent is effectively solved. The present invention can shorten operation time and significantly save operation costs while maintaining the quality of the final oil product.

EXAMPLES

Materials and Methods

The water content of *Euphausia superba* was evaluated according to the standard method of GB 5009.3-2010. The acid value was evaluated according to the standard method of GBT5530-2005 ISO660-1996. The phospholipid was evaluated according to the standard method of GB-T 5537-2008.

The DHA/EPA of *Euphausia superba* oil was evaluated by gas chromatography (GC) according to the standard method of GBT 17377-2008.

Example 1

Figure 3:
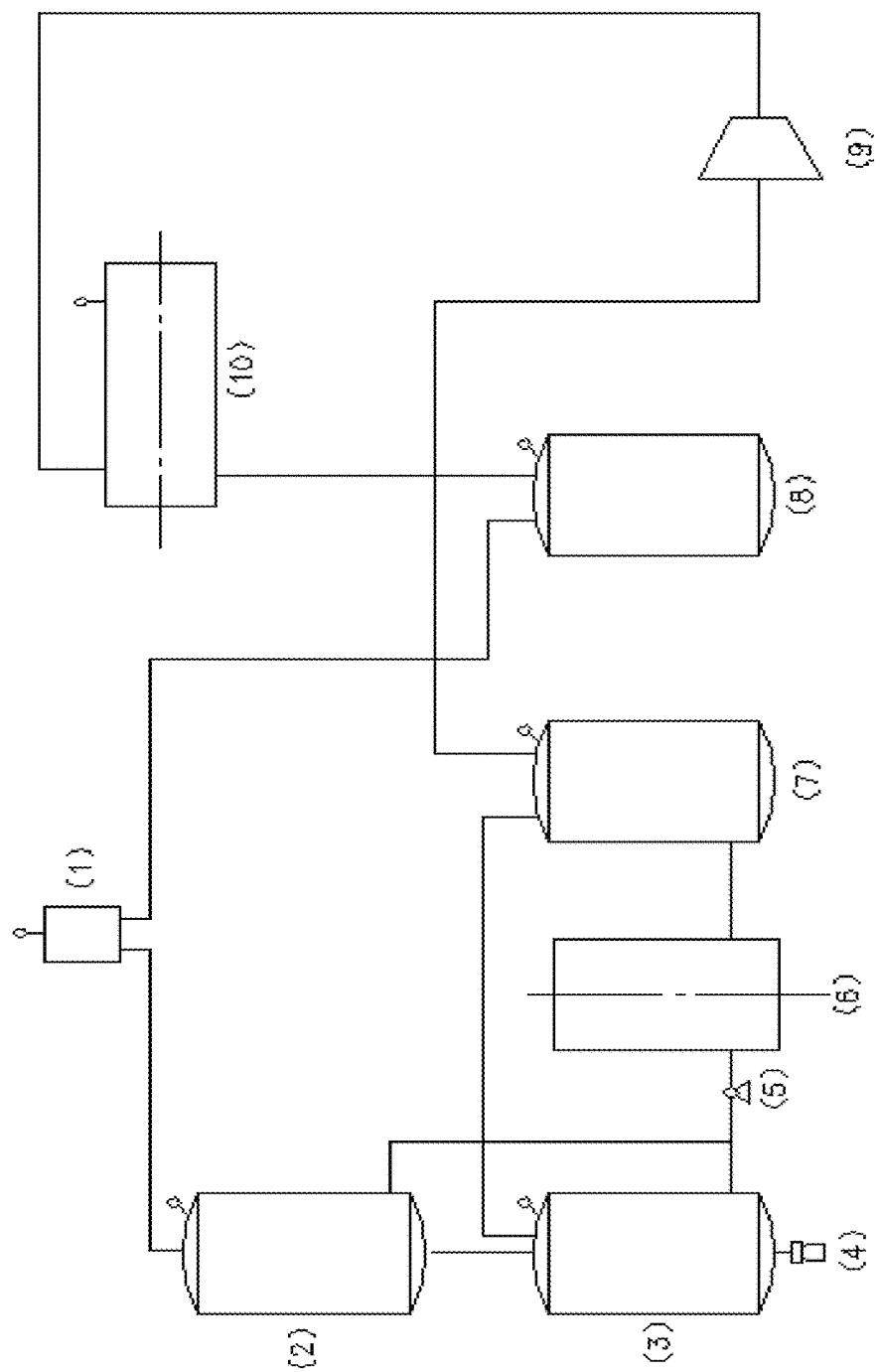
FIG. 3. A schematic diagram of the subcritical fluid extraction. 1, bather; 2, extractor; 3, separator; 4, collector; 5, heat exchanger pump; 6, water tank; 7, buffer tank; 8, solvent pot; 9, compressor; 10, Condenser.

Firstly, thawed *Euphausia superbas* were treated by a low temperature and low oxygen heat pump dehydration process. This process was carried out under nitrogen protection and the krill was spread with a thickness of no more than 2 centimeters. The temperature was controlled at 55° C. and the speed of hot wind was controlled at 3 m/s. The process lasted until that water content of *Euphausia superba* was reduced to 33±0.1%. Secondly, the krill was treated by a microwave-assisted frozen-blasting dehydration process. During the dehydration, the pressure was maintained at lower than 20 Pa and the microwave operation started when the temperature was reduced to lower than −45° C. The microwave power was set to 0.2 w/g. After dehydration, the water content of *Euphausia superba* was reduced to 8.5±0.1%. Then the dehydrated krill were crushed to 30 mesh. The krill oil was extracted by an ultrasound-assisted subcritical fluid method. The krill powder was extracted with a subcritical butane fluid (1 g krill/4 ml solvent) under ultrasonic operation to extract krill oil. During the extraction process, the extraction pressure was kept at 1.2±0.1 MPa, the temperature was kept at 45° C. Under this temperature and pressure, the extraction agent (e.g. butane) is in subcritical liquid phase. The ultrasonic frequency was 25 KHz during the extraction. The extraction process lasted 20 min. After that, the extraction solvent was removed under reduced pressure. A schematic diagram of the subcritical fluid extraction is shown in FIG. 3. The krill powder was added to and sealed in the extractor 2. The subcritical butane fluid under a high pressure was added to the extractor 2 to extract the krill oil, and an ultrasound treatment was applied during the extraction. After extraction, the subcritical butane solution is moved to the separator 3. The pressure of the separator 3 was reduced to ambient or lower pressures so that the butane is turned into gas phase and separated from the krill oil. The krill oil was collected via the collector 4 and the butane gas is transferred to and compressed in the compressor 9 and stored in the solvent pot 8.

Figure 1:
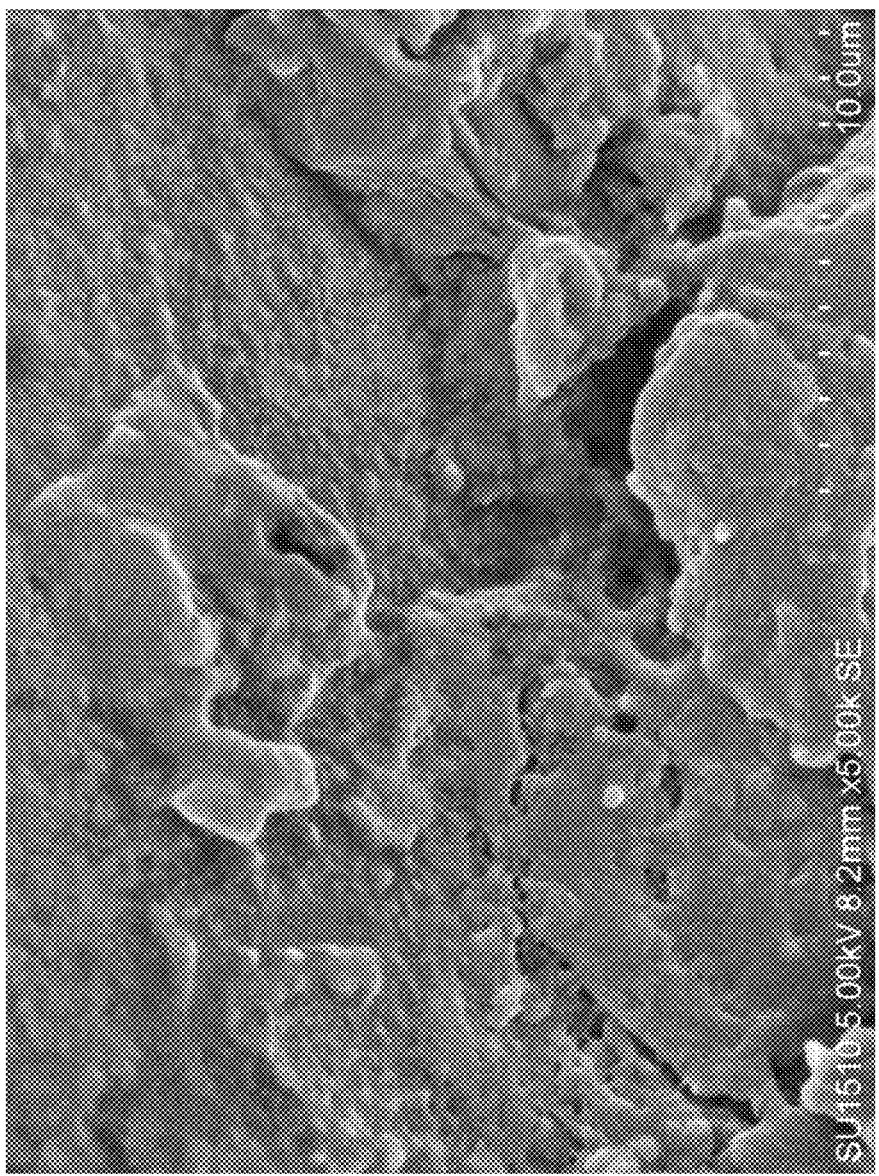
FIG. 1. A scanning Electron Microscope image of krill dehydrated by a low temperature and low oxygen heat pump dehydration system.
Figure 2:
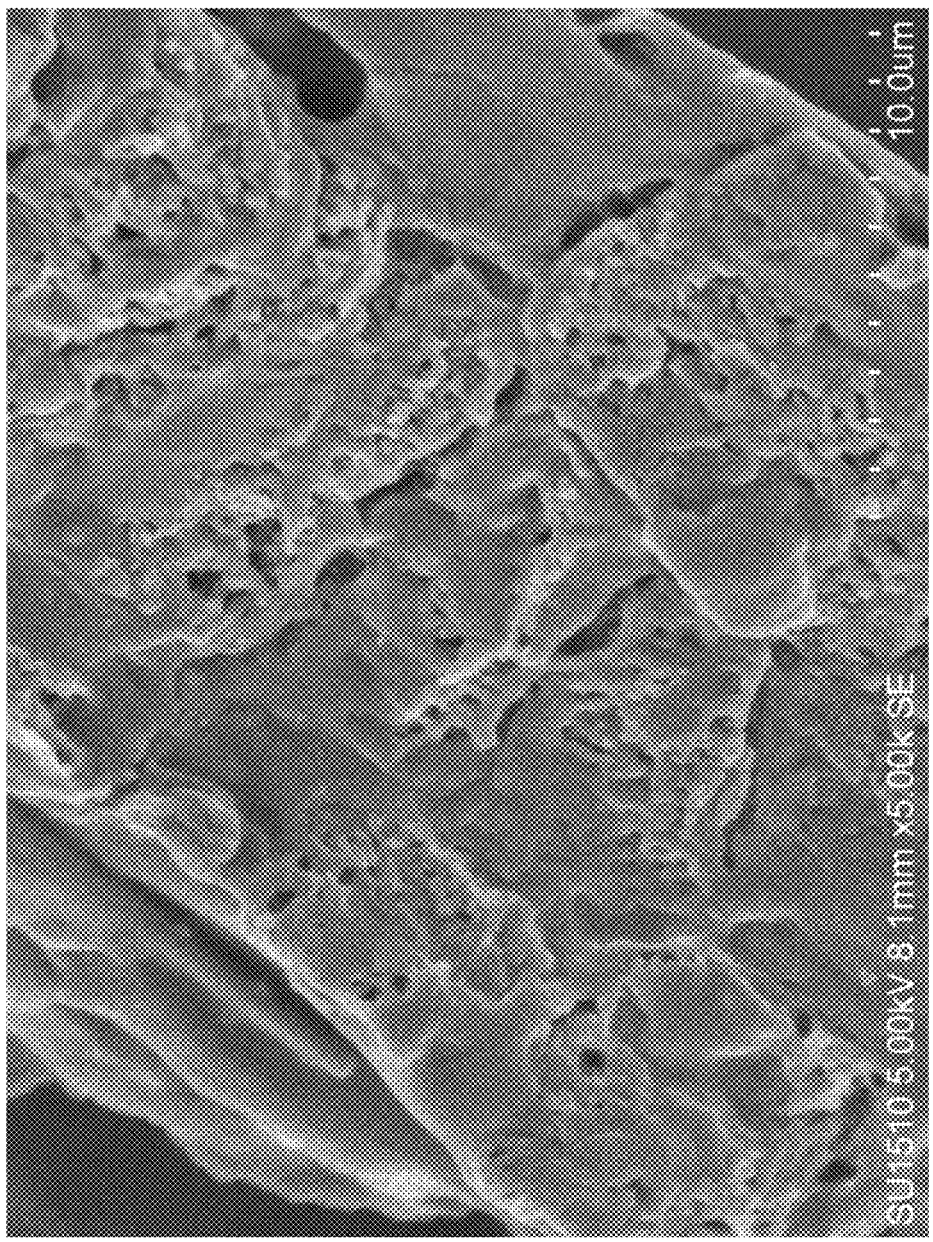
FIG. 2. A scanning Electron Microscope image of krill dehydrated by a microwave-assisted frozen-blasting dehydration system.

The extraction was repeated 4 times and the extracts were collected and centrifuged to obtain the krill oil. The extraction rate of krill oil was 21.32% (dry basis). The acid value and the phospholipid content of the product were 8.4 and 43.10%, respectively. The DHA/EPA content of total fatty acids was 33.85%. As shown in FIGS. 1 and 2, a large number of micro porous structures appeared after the low temperature and low oxygen heat pump dehydration and the microwave-assisted frozen-blasting dehydration treatment.

Example 2

Firstly, thawed *Euphausia superbas* were treated by a low temperature and low oxygen heat pump dehydration process. This process was carried out under nitrogen protection and the krill was spread with a thickness of no more than 2 centimeters. The temperature was maintained at 50° C. and the speed of hot wind through the materials was controlled at 3 m/s. The process lasted until that the water content of *Euphausia superba* was reduced to 33±0.1%. Secondly, the krill was treated by microwave-assisted frozen-blasting dehydration system. The pressure was maintained lower than 20 Pa and the microwave operation started when the temperature was reduced to lower than −45° C. The microwave power was set to 0.2 w/g. After dehydration, the water content was reduced to 8.5±0.1%. Then the dehydrated krill were crushed to 30 mesh. The krill powder was extracted with a subcritical butane fluid (1 g krill/4 ml solvent) under ultrasonic operation to extract krill oil. During the extraction process, the extraction pressure was kept at 1.2±0.1 MPa, the temperature was kept at 45° C. and the ultrasonic frequency was 25 KHz. The extraction process lasted 20 min. After that, the extraction solvent was removed under reduced pressure. The extraction was repeated 3 times and extracts were collected and filtered to obtain the krill oil.

The extraction rate of *Euphausia superba* oil was 21.02% (dry basis). The acid value and the phospholipid content were 8.1 and 43.02%, respectively. The DHA/EPA content of total fatty acids was 33.48%.

Example 3

Firstly, thawed *Euphausia superbas* were treated by a low temperature and low oxygen heat pump dehydration process. This process was carried out under nitrogen protection and the krill was spread with a thickness of no more than 2 centimeters. The temperature was maintained at 60° C. and the speed of hot wind through the materials was controlled at 3 m/s. The process lasted until that the water content of *Euphausia superba* was reduced to 33±0.1%. Secondly, the krill was treated by microwave-assisted frozen-blasting dehydration system. The pressure was maintained at lower than 20 Pa and the microwave operation started work when the temperature was reduced to lower than −45° C. The microwave power was set to 0.2 w/g. After dehydration, the water content was reduced to 8.5±0.1%. Then the dehydrated krill were crushed to 30 mesh. The krill powder was extracted with a subcritical butane fluid (1 g krill/4 ml solvent) under ultrasonic operation to extract krill oil. During the extraction process, the extraction pressure was kept at 1.2±0.1 MPa, the temperature was kept at 45° C. and the ultrasonic frequency was 25 KHz. The extraction process lasted 20 min. After that, the extraction solvent was removed under reduced pressure. The extraction was repeated 5 times and the extracts were collected and filtered to obtain *Euphausia superba* oil.

The extraction rate of *Euphausia superba* oil was 21.62% (dry basis). The acid value and the phospholipid content were 9.5 and 43.16%, respectively. The DHA/EPA content of total fatty acids was 33.16%.

Example 4

Freeze-drying Combined with Subcritical Extraction

The frozen *Euphausia superbas* were freeze-dried to have a water content at 8.5±0.1% and then crushed to 30 mesh. The krill oil was extracted by an ultrasound-assisted subcritical fluid method. The krill powder was extracted with subcritical butane fluid (1 g/4 ml) under an ultrasonic operation to extract oil. During the extraction process, the extraction pressure was kept at 1.2±0.1 MPa, the temperature was 45° C. and the ultrasonic frequency was 25 KHz. The extraction lasted 20 min. After that, the extraction solvent was removed under reduced pressure. The extraction was repeated 4 times and extracts were collected and filtered to obtain *Euphausia superba* oil.

The extraction rate of *Euphausia superba* oil was 22.10% (dry basis). The acid value and the phospholipid content were 7.2 and 43.52%, respectively. The DHA/EPA content of total fatty acids was 34.94%.

Example 5

Hot Air Drying Combined with Subcritical Extraction

Thawed *Euphausia superba* was dried by hot air at 90° C. to reduce water content to 8.5±0.1%. Then the materials were crushed to 30 mesh. The krill powder was extracted with subcritical butane fluid (1 g/4 ml) under an ultrasonic operation to extract oil. During the extraction process, the extraction pressure was kept at 1.2±0.1 MPa, the temperature was 45° C. and the ultrasonic frequency was 25 KHz. The extraction lasted 20 min. After that, the extraction solvent was removed under reduced pressure. The extraction was repeated 4 times. The extracts are collected and filtered to obtain *Euphausia superba* oil.

The extraction rate of *Euphausia superba* oil was 16.2% (dry basis). The acid value and the phospholipid content were 19.2 and 42.36%, respectively. The DHA/EPA content of total fatty acids was 31.94%.

Example 6

Hot Air Drying Combined with Solvent Extraction

Thawed *Euphausia superba* was dried by hot air at 90° C. to reduce the water content to 8.5±0.1%. Then the materials were crushed to 30 mesh. 1 g Krill powder was mixed with 4 mL n-Hexane to extract oil. During the extraction process, temperature was kept at 55° C. Single extraction process lasted 2 h and repeated 3 times. Extracts were collected and filtered to obtain *Euphausia superba* oil.

The extraction rate of *Euphausia superba* oil was 15.5% (dry basis). The phospholipid content and the acid value were 42.26% and 21.5, respectively. The DHA/EPA content of total fatty acids was 30.02%.

Example 7

Dehydration Combined with Subcritical Extraction

Thawed *Euphausia superbas* were treated by a low temperature and low oxygen heat pump dehydration process. This process was carried out under nitrogen protection and the krill was spread with a thickness of no more than 2 centimeters. The temperature was maintained at 55° C. and the speed of hot wind through the materials was controlled at 3 m/s. The process lasted until that water content of *Euphausia superba* reduced to 35±0.1%. Then the krill was treated by a microwave-assisted frozen-blasting dehydration system. The pressure was maintained lower than 20 Pa, and microwave operation started when the temperature was reduced to lower than −45° C. The microwave power was set as 0.2 w/g. After dehydration, the water content was reduced to 8.5±0.1%. Then the materials were crushed to 30 mesh. 1 g krill powder was mixed with 4 mL subcritical extraction solvent and was treated with an ultrasound to extract oil. During the extraction process, the extraction pressure was kept at 1.2±0.1 MPa, the temperature was 45° C. and the ultrasonic frequency was 25 KHz. The extraction lasted 20 min. After that, the extraction solvent was removed by reducing pressure. The extraction was repeated 4 times and then extracts were collected and filtered to obtain *Euphausia superba* oil.

The extraction rate of *Euphausia superba* oil was 21.52% (dry basis). The acid value and the phospholipid content were 8.3 and 43.20%, respectively. The DHA/EPA content of total fatty acids was 33.95%.

Example 8

Cryogenic Heat Dehydration Combined with Subcritical Extraction

Thawed *Euphausia superbas* were treated by a low temperature and low oxygen heat pump dehydration process. This process was carried out under nitrogen protection and the krill was spread with a thickness of no more than 2 centimeters. The temperature was maintained at 55° C. and the speed of hot wind through the materials was controlled at 3 m/s. The process lasted until that water content of *Euphausia superba* was reduced to 8.5±0.1%. Then the materials were crushed to 30 mesh. 1 g krill powder was mixed with 4 mL subcritical butane solvent and was treated with an ultrasound to extract oil. During the extraction process, the extraction pressure was kept at 1.2±0.1 MPa, the temperature was 45° C. and the ultrasonic frequency was 25 KHz. The extraction lasted 20 min. After that, the extraction solvent was removed by reducing pressure. The extraction was repeated 4 times and extracts were collected and filtered to obtain *Euphausia superba* oil.

The extraction rate of *Euphausia superba* oil was 17.42% (dry basis). The acid value and the phospholipid content were 12.3 and 42.78%, respectively. The DHA/EPA content of total fatty acids was 32.05%.

TABLE 1

The parameter of each example

| | Dehydration time | Extraction rate (dry basis) | Acid value | Phospholipid content | DHA/EPA content of fatty acids |
|---|---|---|---|---|---|
| Example 1 | 4-7 h | 21.32% | 8.4 | 43.10% | 33.85% |
| Example 2 | 7-10 h | 21.02% | 8.1 | 43.02% | 33.48% |
| Example 3 | 3-6 h | 21.62% | 9.5 | 43.16% | 33.16% |
| Example 4 | 25-30 h | 22.10% | 7.2 | 43.52% | 34.94% |
| Example 5 | 2-4 h | 16.2% | 19.2 | 42.36% | 31.94% |
| Example 6 | 2-4 h | 15.5% | 21.5 | 42.26% | 30.02% |
| Example 7 | 7-11 h | 21.52% | 8.3 | 43.20% | 33.95% |
| Example 8 | 3-6 h | 17.42% | 12.3 | 42.78% | 32.05% |

In example 1-3, combining double dehydration system with subcritical extraction, the extraction rate, acid value and phospholipid content of *Euphausia superba* oil were comparatively ideal. The extraction time of example 2 was less than example 1 and 3, therefore the extraction rate was slightly lower. In example 2, the temperature of heat pump was lower than example 1, thus the dehydration time needed is longer. In example 3, the temperature of heat pump was increased in order to decrease dehydration time, but the acid value was slightly higher than example 1. In example 7, the water content of *Euphausia superbas* was 35% after treated by the low temperature and low oxygen heat pump dehydration system. It made the dehydration time of the second process of microwave-assisted frozen-blasting longer, so that the whole dehydration time was increased.

In example 4, extraction rate and acid value were slightly increased compared to example 1, but pre-treatment time was so long that much more energy was consumed. In example 5-6, the krill was not dehydrated by the double dehydration system but hot air. The extraction rate in examples 5-6 was 5-6% lower than that of examples 1-4. The method of hot air drying used in example 5 shortened dehydration time, but led to high acid value. In example 6, solvent extraction could not avoid the high acid value caused by high temperature. In example 8, krill was dried by hot air which decreased dehydration time but resulted in a lower extraction rate.

It is found that high water content can negatively affect extraction efficiency while too low water content of the dehydrated krill material does not benefit the oil extraction, but it costs more time and energy. It is also found that material-to-liquid ratio has an important effect on the extraction rate. If the material-to-liquid ratio is too low, the extraction is incomplete and the extraction rate is lower with the same number of extractions.

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. A method for *Euphausia superba* dehydration, comprising dehydrating *Euphausia superbas* with a low temperature and low oxygen heat pump dehydration system and a microwave-assisted frozen-blasting dehydration system, wherein the temperature of said low temperature and low oxygen heat pump dehydration system is maintained at 50-60° C. and said low temperature and low oxygen heat pump dehydration system is filled with nitrogen to exclude air; and wherein the air pressure of said microwave-assisted frozen-blasting dehydration system is controlled to be lower than 20 Pa, its temperature is controlled at −45 to −50° C., and the power of microwave is controlled at 0.15-0.25 w/g.

2. The method of claim 1, wherein said *Euphausia superbas* are fresh or frozen.

3. The method of claim 1, wherein after dehydrating the *Euphausia superbas* by said low temperature and low oxygen heat pump dehydration system, the water content of the *Euphausia superbas* is decreased from 79-81% to 30%-35%, and after dehydrating the *Euphausia superbas* by said microwave-assisted frozen-blasting dehydration system, the water content of the *Euphausia superbas* is further decreased to 8%-9%.

4. The method of claim 1, wherein said low temperature and low oxygen heat pump dehydration system is installed in a shrimp boat for krill dehydration.

5. A method for *Euphausia superba* oil extraction, comprising
  a, dehydrating *Euphausia superbas* using a low temperature and low oxygen heat pump dehydration system and a microwave-assisted frozen-blasting dehydration system;
  b, crushing the dehydrated *Euphausia superbas*; and
  c, extracting hill oil from the crushed *Euphausia superbas* by an ultrasound-assisted subcritical fluid extraction method.

6. The method of claim 5, wherein said dehydrated *Euphausia superbas* are crushed to 30-60 mesh.

7. The method of claim 5, wherein the extraction solvent used for said oil extraction is one to three reagents selected from butane, methyl ether and 1,1,1,2-tetrafluoroethane; the material-to-liquid ratio is 1:3-1:5 (g/ml), the extraction temperature is 40-50° C., the extraction pressure is 1.1-1.3 MPa, and the ultrasonic frequency is 25-35 KHz; wherein each extraction process lasts 15-30 min, and solvent is removed under ambient or reduced pressure after every single extraction; and wherein the extraction is repeated 3-5 times and the extracts are collected and centrifuged to remove impurities.

* * * * *